United States Patent
Zhang et al.

(10) Patent No.: US 9,140,851 B2
(45) Date of Patent: Sep. 22, 2015

(54) DISPERSION COMPENSATION FIBER

(75) Inventors: Shuqiang Zhang, Hubei (CN); Mingfeng Fan, Hubei (CN); Song Wang, Hubei (CN); Jin Xu, Hubei (CN); Jie Luo, Hubei (CN); Beibei Cao, Hubei (CN)

(73) Assignee: YANGTZE OPTICAL FIBRE AND CABLE JOINT STOCK LIMITED COMPANY, Wuhan, Hubei (CN)

( * ) Notice: Subject to any disclaimer, the term of this patent is extended or adjusted under 35 U.S.C. 154(b) by 137 days.

(21) Appl. No.: 14/009,324

(22) PCT Filed: Mar. 13, 2012

(86) PCT No.: PCT/CN2012/072223
§ 371 (c)(1),
(2), (4) Date: Oct. 1, 2013

(87) PCT Pub. No.: WO2013/013513
PCT Pub. Date: Jan. 31, 2013

(65) Prior Publication Data
US 2014/0369639 A1   Dec. 18, 2014

(30) Foreign Application Priority Data
Jul. 25, 2011 (CN) .......................... 2011 1 0208342

(51) Int. Cl.
*G02B 6/036* (2006.01)
*G02B 6/02* (2006.01)

(52) U.S. Cl.
CPC ........ *G02B 6/03666* (2013.01); *G02B 6/02261* (2013.01)

(58) Field of Classification Search
None
See application file for complete search history.

(56) References Cited

U.S. PATENT DOCUMENTS 6,666,591 B2 * 12/2003 Sasaoka et al. ................ 385/95
6,805,497 B1 * 10/2004 Ishikawa et al. .............. 385/96
(Continued)

FOREIGN PATENT DOCUMENTS

| CN | 1165958 A | 11/1997 |
| CN | 1198219 A | 11/1998 |

(Continued)

OTHER PUBLICATIONS

English translation of written opinion for PCT/CN2012/072223, mail date Jun. 28, 2012.*

(Continued)

*Primary Examiner* — Mike Stahl
(74) *Attorney, Agent, or Firm* — Locke Lord LLP; Tim Tingkang Xia, Esq.

(57) ABSTRACT

A dispersion compensation fiber comprises a fiber core and cladding. The fiber core is a core layer mainly doped with germanium and having a positive relative refractive index difference. The cladding covering the fiber core comprises a trench cladding mainly doped with fluorine, an annular cladding mainly doped with germanium, a matching cladding mainly doped with fluorine, and an outermost mechanical cladding in order. Relative refractive index differences of the fiber core and the claddings are respectively: $\Delta 1\%$ being 1.55% to 2.20%, $\Delta 2\%$ being $-0.55\%$ to $-0.30\%$, $\Delta 3\%$ being 0.40% to 0.65%, $\Delta 4\%$ being $-0.20\%$ to $-0.01\%$, and $\Delta 5\%$ being 0. Radius ranges, from R1 to R5, of the fiber core and the claddings are respectively: R1 being 1.4 to 1.7 µm, R2 being 4.1 to 4.8 µm, R3 being 6.7 to 8.8 µm, R4 being 10 to 17 µm, and R5 being 38 to 63 µm.

8 Claims, 2 Drawing Sheets

(56) References Cited

U.S. PATENT DOCUMENTS

| | | | |
|---|---|---|---|
| 2002/0001444 A1* | 1/2002 | Hirano et al. | 385/123 |
| 2002/0034364 A1* | 3/2002 | Veng | 385/96 |
| 2003/0086670 A1* | 5/2003 | Moridaira et al. | 385/123 |
| 2004/0136672 A1* | 7/2004 | Beaumont et al. | 385/127 |
| 2005/0094955 A1 | 5/2005 | Bickham et al. | |
| 2007/0065081 A1* | 3/2007 | Antona et al. | 385/123 |
| 2007/0140635 A1* | 6/2007 | Bigot-Astruc et al. | 385/126 |
| 2010/0002997 A1* | 1/2010 | Gruner-Nielsen | 385/95 |
| 2010/0178504 A1 | 7/2010 | Chen et al. | |

FOREIGN PATENT DOCUMENTS

| | | | | |
|---|---|---|---|---|
| CN | 1414404 A | 4/2003 | | |
| CN | 1460868 A | 12/2003 | | |
| CN | 1492246 A | 4/2004 | | |
| CN | 1609640 A | 4/2005 | | |
| CN | 1891649 A | 1/2007 | | |
| CN | 101498811 A | 8/2009 | | |
| CN | 101718888 A * | 6/2010 | | G02B 6/036 |
| CN | 102243336 A | 11/2011 | | |

OTHER PUBLICATIONS

State Intellectual Property Office of the People's Republic of China, "Office Action", China, Aug. 3, 2012.

State Intellectual Property Office of the People's Republic of China, "International Search Report", China, Jun. 28, 2012.

* cited by examiner

DISPERSION COMPENSATION FIBER

FIELD OF THE INVENTION

The present invention relates to a dispersion compensation fiber (DCF) working at an optical communication window of a C waveband (a waveband from 1530 nm to 1565 nm). The fiber is usable for compensating dispersion and a dispersion slope of a standard single mode fiber (G.652, ITU-T standard).

BACKGROUND OF THE INVENTION

With the popularization of a dense wavelength division multiplexing (DWDM) system of a standard single mode fiber, and the development trend towards high speed, long distance, non-relay and dense channels, the wavelength division multiplexing technology is developed rapidly; and the working wavelength band is rapidly expanded, and the wavelength is diversified rapidly.

At the wavelength of 1310 nm, a long-haul fiber constructed based on G.652 fibers has minimum dispersion, but has significant attenuation, while at the waveband of 1550 nm, the long-haul fiber has lowest attenuation (about 0.20 dB/km). Therefore, people are eager to utilize the wavelength window of 1550 nm. The successful development and practice of an erbium-doped optical fiber amplifier (EDFA) working at the waveband of 1550 nm further eliminate the limitation of the attenuation on a communications system, which makes the waveband of 1550 nm a preferential window for a large-capacity and long-distance optical wave system. At the waveband of 1550 nm, a commercial single mode fiber and a DCF thereof at present have the following dispersion features: a dispersion coefficient of a non-dispersion shifted single mode fiber (G.652C/D, ITU-T standard) is about 17 ps/nm-km, and a dispersion slope thereof is about 0.058 ps/nm$^2$-km; therefore, a relative dispersion slope (RDS) required by the non-dispersion shifted single mode fiber is about 0.0036 nm$^{-1}$.

In order to solve the upgrade and capacity expansion problems of a communications network formed of 1310 nm zero-dispersion standard single mode fibers at the waveband of 1550 nm, dispersion compensation technologies are widely used all over the world to solve the link dispersion. At present, a dispersion compensation fiber (DCF) technology is largely commercialized to compensate the dispersion and dispersion slope of a communication link fiber at the same time. Compared with other dispersion compensation technologies such as fiber grating dispersion compensation and electronic dispersion compensation, this technology is more reliable and more mature.

The DCF changes transmission parameters of an optic signal in the fiber by adjusting a waveguide structure of the fiber, so that the core of the fiber has a great refractive index, thereby achieving great negative dispersion value and dispersion slope.

In practical applications, the DCF is made into a dispersion compensation module and connected into the communication link. At this time, the splice loss between the DCF and the standard communication fiber becomes an important impact factor of insertion loss. Therefore, the splice performance of the DCF is a key parameter. A DCF with applicability not only needs to have appropriate optical performance and transmission performance, but also needs to have excellent splice performance, which means a low splice loss and an efficient and stable splice process. The splice performance becomes an important factor that influences the DCF cost and performance. A lower splice loss guarantees better performance of the module, and a faster and more efficient splice procedure reduces the splice cost.

In published patent documents, some product and method examples for improving the DCF splice performance are provided. For a 1550 nm light source, a mode field diameter of the DCF is about 5 μm, while a mode field diameter of a standard communication fiber is 10.5 μm. As a result of such difference in the mode field (mode field mismatching), leakage easily occurs when optical power is introduced from a large mode field to a small mode field. The prior art relates to employing a complex splice process to disperse the DCF fiber core near the end face interface of the splice fiber, so as to distribute the DCF mode field nearby into a conical transition area; a "chimney effect" of the area helps reduce the optical power loss caused by mode field mismatching, thereby reducing the splice loss.

The prior art also relates to a method of using a "bridge fiber" as a bridge to connect the DCF and standard single mode fiber. The bridge fiber is a kind of special fiber with a structure similar to the DCF, while a doping concentration of each layer is lower than that of the DCF. Two ends of the bridge fiber are respectively spliced with the DCF and the standard single mode fiber by using different splice processes. The end of the bridge fiber, which is connected with the DCF, uses low splice power and short splice time so as to reduce core area element dispersion and mode field mismatching; the other end of the bridge fiber, which is connected with the single mode fiber, uses high splice power and long splice time so that the fiber core of the bridge fiber is dispersed, thereby achieving mode field matching.

The U.S. Pat. No. 6,603,914 introduces a composition structure and a manufacturing method of a DCF, but does not relate to the splice method and the optical transmission performance of the DCF. The U.S. Pat. No. 6,543,942 describes a method for connecting a DCF and a standard single mode fiber by using a bridge fiber, which reduces the splice loss, but the patent does not correspondingly disclose the optical transmission performance of the DCF; in addition, the method involves a complex process, takes a long time, has low splice efficiency, and thus is not practical. No Chinese patent relating to the splice method for a DCF is available.

The documents described above relate to various methods for improving the splice performance of the DCF and standard single mode fiber as well as corresponding DCF products, but no method capable of improving the splice performance while having excellent optical transmission performance and a spice method thereof have been reported.

Therefore, a heretofore unaddressed need exists in the art to address the aforementioned deficiencies and inadequacies.

DEFINITIONS OF TERMS USED IN THE INVENTION

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. It will be appreciated that the same thing can be said in more than one way. Consequently, alternative language and synonyms may be used for any one or more of the terms discussed herein, nor is any special significance to be placed upon whether or not a term is elaborated or discussed herein.

As used herein, the terms "weight percentage" refer to a weight percentage of an element in a small enough area in a fiber layer, expressed in the form of wt %.

As used herein, the terms "relative refractive index difference" or "$\Delta i$ %" is defined as follows:

$$\Delta i\ \% = [(n_i^2 - n_0^2)/2n_i^2] \times 100\% \approx \frac{n_i - n_0}{n_0} \times 100\%,$$

where $\Delta i$ % is a relative refractive index difference of each layer of the fiber core; $n_i$ is the refractive index if an $i^{th}$ fiber material, and $n_0$ is the refractive index of pure quartz glass. The refractive index distribution of each layer is a refractive index value of said layer at respective radial points. Unless otherwise specified, all $\Delta i$ % in the present invention is a relative refractive index difference with a greatest absolute value in each fiber core layer.

As used herein, the terms "Radius: Ri (i=1, 2, 3, 4, 5) is used to represent the radius, and the radius Ri of each layer is a distance between the center line of the fiber to a point of said layer farthest away from the center axis.

As used herein, the terms "RDS: A relative dispersion slope (RDS value) of the fiber at a certain characteristic wavelength is defined a ratio of a dispersion slope (DS) to dispersion (D) on the waveband: RDS=DS/D. At the C waveband window, the wavelength of 1550 nm is usually used as a central wavelength, and $RDS_{1550}=DS_{1550}/D_{1550}$.

SUMMARY OF THE INVENTION

The present invention is directed to a DCF having a high negative dispersion coefficient and an appropriate dispersion slope at a C waveband so as to solve the defects in the prior art. The DCF has excellent splice performance and can achieve fast splice and low splice loss. In addition, the DCF maintains excellent optical and transmission performance.

To solve the above problems, the present invention provides a DCF, which includes a fiber core and claddings surrounding the fiber core. The fiber core is a core layer mainly doped with germanium and having a positive relative refractive index difference. The claddings covering the fiber core include a trench cladding mainly doped with fluorine, an annular cladding mainly doped with germanium, a matching cladding mainly doped with fluorine, and an outermost mechanical cladding disposed from the inner to the outer in sequence.

Relative refractive index difference ranges of the fiber core and the claddings are as follows: $\Delta 1\%$ is in a range of 1.55% to 2.20%, $\Delta 2\%$ is in a range of –0.55% to –0.30%, $\Delta 3\%$ is in a range of 0.40% to 0.65%, $\Delta 4\%$ is in a range of –0.20% to –0.01%, and $\Delta 5\%$ is 0.

Radius ranges, from R1 to R5, of the fiber core and the claddings are as follows: R1 is in a range of 1.4 to 1.7 μm, R2 is in a range of 4.1 to 4.8 μm, R3 is in a range of 6.7 to 8.8 μm, R4 is in a range of 10 to 17 μm, and R5 is in a range of 38 to 63 μm.

According to embodiments of the present invention, a weight percentage of germanium in the fiber core is in a range of 15 wt % to 35 wt %, a weight percentage of fluorine in the trench cladding is in a range of 1 wt % to 5 wt %, a weight percentage of germanium in the annular cladding is in a range of 4 wt % to 10 wt %, and a weight percentage of fluorine in the matching cladding is in a range of 0.3 wt % to 3 wt %.

According to embodiments of the present invention, a weight percentage of chlorine in the fiber core and each cladding is in a range of 0 wt % to 1.0 wt %.

According to embodiments of the present invention, the weight percentage of germanium in the fiber core is in a range of 20 wt % to 30 wt %, the weight percentage of fluorine in the trench cladding is in a range of 2.0 wt % to 3.5 wt %, a weight percentage of germanium in the annular cladding is in a range of 5 wt % to 8 wt %, and the weight percentage of fluorine in the matching cladding is in a range of 0.7 wt % to 1.5 wt %.

According to embodiments of the present invention, a weight percentage of chlorine in the fiber core is in a range of 0.1 wt % to 0.4 wt %, a weight percentage of chlorine in the trench cladding is in a range of 0.1 wt % to 0.3 wt %, a weight percentage of chlorine in the annular cladding is in a range of 0.1 wt % to 0.3 wt %, a weight percentage of chlorine in the matching cladding is in a range of 0.1 wt % to 0.4 wt %, and a weight percentage of chlorine in the mechanical cladding is in a range of 0.1 wt % to 0.7 wt %.

According to embodiments of the present invention, at a wavelength range of 1530 nm to 1565 nm (C waveband), a dispersion coefficient is –120 ps/nm-km to –260 ps/nm-km, a dispersion slope is negative, an attenuation coefficient is smaller than or equal to 0.45 dB/km, an RDS is in a range of 0.0033 $nm^{-1}$ to 0.0040 $nm^{-1}$, and polarization mode dispersion is smaller than or equal to 0.25 $ps/km^{1/2}$.

The relative refractive index difference and geometrical relation between the fiber core and the trench cladding are important impact factors of the optical and transmission performance of the DCF. The annular cladding has a function of adjusting a mode field diameter and a cutoff wavelength of the DCF. The trench cladding, the annular cladding, and the matching cladding further have a function of adjusting splice loss: a splicer generates a great amount of heat at an instant through arc discharge during splice work, so that fluorine in cladding layers is dispersed at a high temperature, thereby causing the refractive index near the splice point to change; as a result, the DCF mode field nearby is converted from an original small mode field to a conical transitional mode field area, where a "chimney effect" of the area helps reduce the optical power loss caused by mode field mismatching, thereby reducing the splice loss. The outermost mechanical cladding has high viscosity, and can bear a large proportion of drawing tension during drawing, thereby effectively preventing the stress caused by the drawing tension from concentrating at the fiber core part, so that the fiber attenuation is not increased.

In one embodiment, the DCF employs a plasma chemistry vapor deposition (PCVD) process to deposit a glass layer doped with quartz on an inner wall of a highly pure quartz lining pipe; then the hollow quartz pipe after the deposition is collapsed to form a solid quartz glass core rod; and finally, the core rod is sleeved into a quartz glass casing pipe to form a preform, which is drawn to be a fiber on a drawing tower.

In one embodiment, the DCF fiber is spliced by using a Fujikura FSM-60S splicer, and main splice parameters are shown in Table 1.

TABLE 1

| DCF + SMF splice parameters of FSM-60S splicer | | |
|---|---|---|
| Splice parameter | Set value | Unit of set value |
| Position calibration | cladding | |
| Cutting degree | 0.4 | degree |
| Loss limit | 0.2 | dB |

TABLE 1-continued

DCF + SMF splice parameters of FSM-60S splicer

| Splice parameter | Set value | Unit of set value |
|---|---|---|
| Fiber core angle limit | 0.4 | degree |
| Clean discharge | 150 | ms |
| Fiber end face interval | 15 | μm |
| Fiber end face position | Left-15 | μm |
| Fiber warming time | 180 | ms |
| Overlap | 10 | μm |
| Discharge of one strength unit | Standard-15 | bit |
| Discharge of one time unit | 1200 | ms |
| Conical splice waiting | 400 | ms |
| Conical splice speed | 20 | bit |
| Conical splice length | 10 | μm |
| MFD-left side setting | 5 | μm |
| MFD-right side setting | 9.3 | μm |

According to embodiments of the present invention, total splice loss at two contacts between a dispersion compensation module made of the DCF and a single mode fiber (SMF) pigtail is smaller than or equal to 2 dB; time for splicing one contact between the DCF and an SMF pigtail is less than or equal to 90 s.

Among other things, the present invention achieves the following beneficial effects:

1. The present invention provides a DCF with doped core layer and claddings; the trench cladding, annular cladding, and matching cladding are subject to a discharge effect of a splicer, and elements near the contact are dispersed, which causes the refractive index to change; hence, a conical transitional mode field area is formed, thereby reducing the mode field mismatching and reducing splice loss.

2. The DCF of the present invention has appropriate element structural distribution, so that the viscosity of the core layer and the claddings are matched, implementing fast splice between the DCF and the SMF. Therefore, time for splicing one contact is reduced to 90 s, and even less than 60 s. The splice efficiency is significantly improved, and the splice cost is reduced.

3. The present invention not only has excellent splice performance, but also has low attenuation coefficient and PMD coefficient, and has a negative dispersion coefficient with a great absolute value and an appropriate RDS at the C waveband, thereby facilitating upgrade of an optical communications system designed to work at a C waveband window; the fiber is inserted into a communication link more easily, hence satisfying requirement of high-speed and large-capacity system transmission. Devices based on the DCF are especially suitable for effectively compensating a high-speed DWDM system based on G.652 fibers.

These and other aspects of the present invention will become apparent from the following description of the preferred embodiment taken in conjunction with the following drawings, although variations and modifications therein may be effected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DESCRIPTION OF EMBODIMENTS OF THE INVENTION

Figure 1:
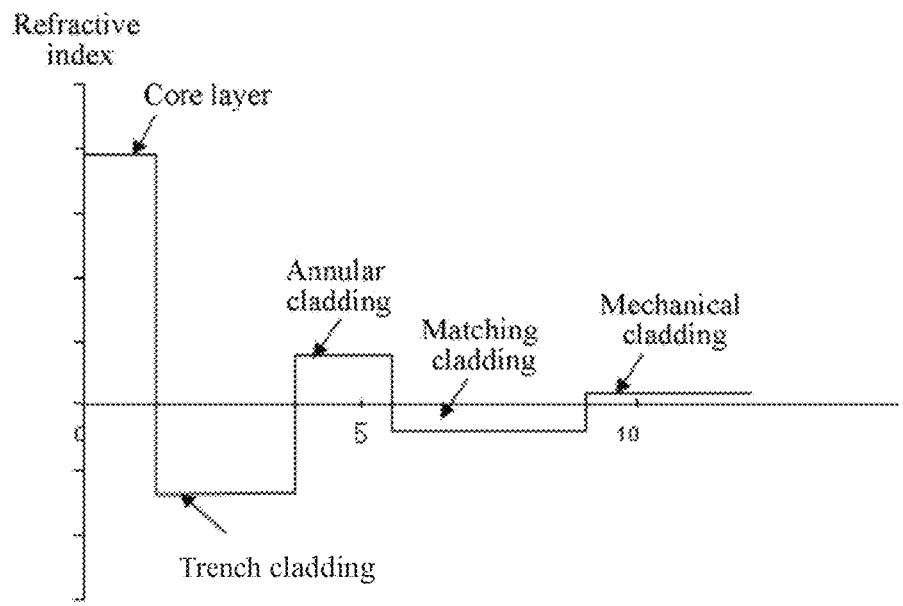
FIG. 1 is a schematic view of relative refractive index difference distribution according to an embodiment of the present invention.
Figure 2:
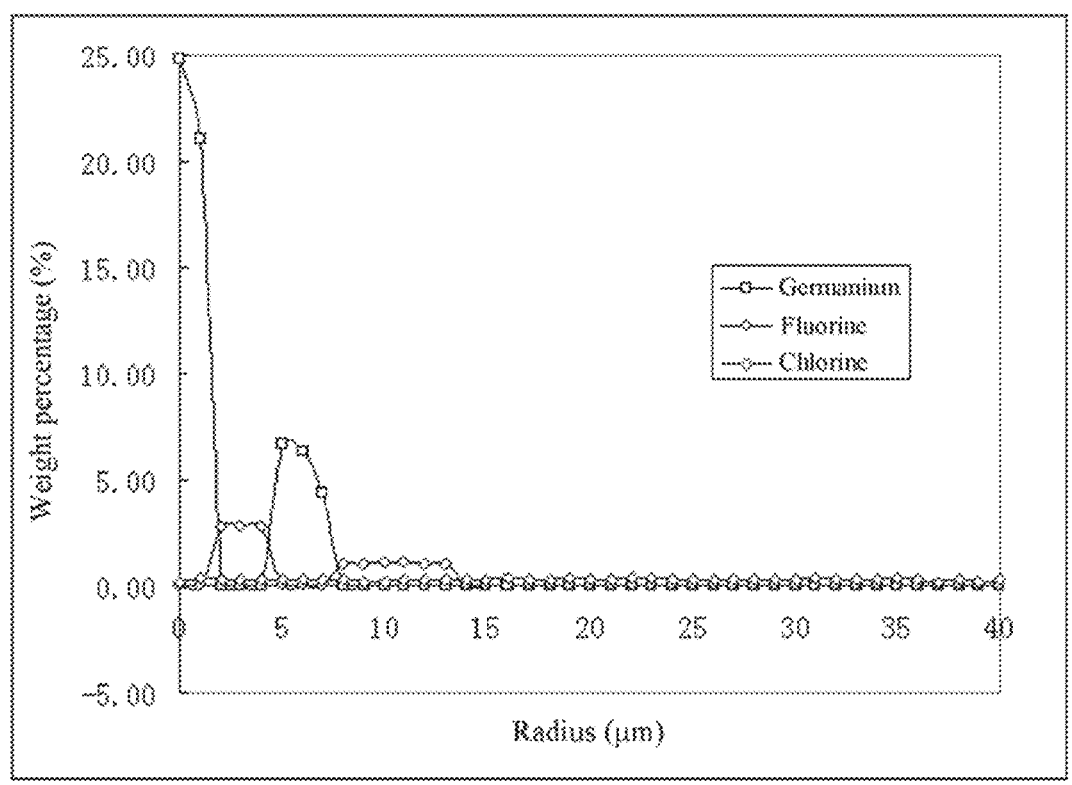
FIG. 2 is a schematic view showing weight percentages of germanium, fluorine, and chlorine elements according to an embodiment of the present invention.
Figure 3:
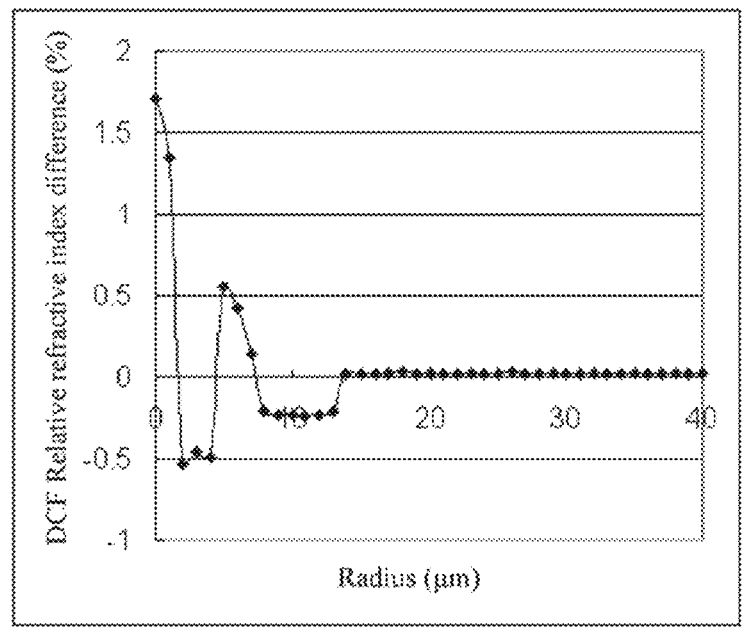
FIG. 3 is a sectional schematic structural view of relative refractive index differences according to an embodiment of the present invention.
Figure 4:
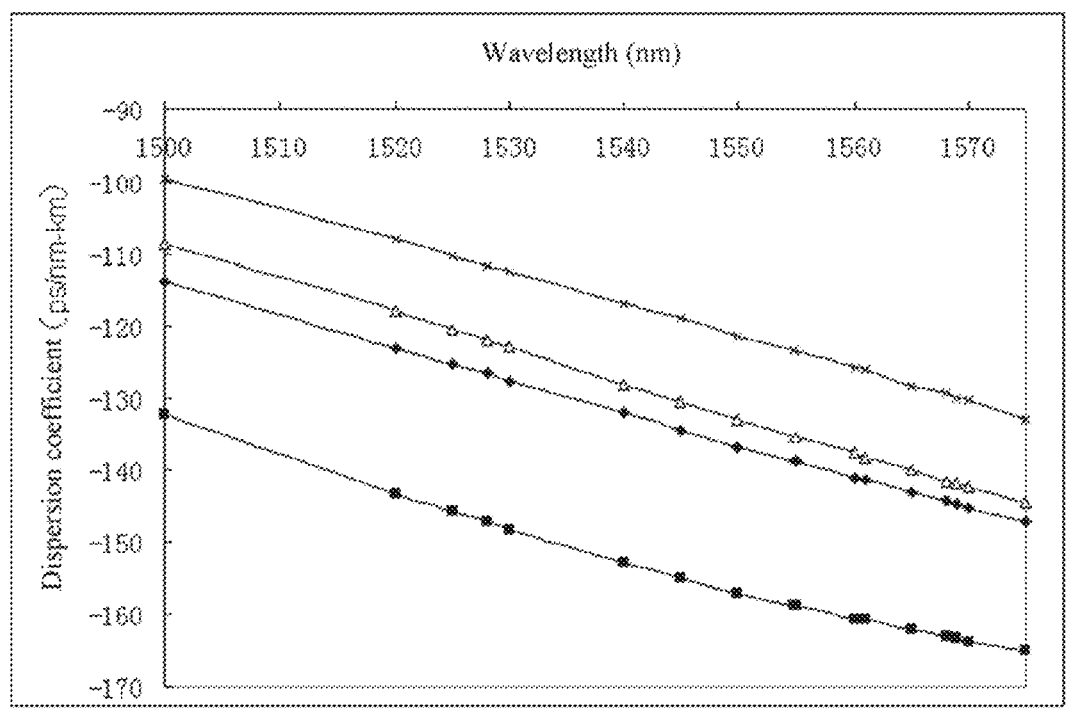
FIG. 4 shows DCF dispersion curves of the four embodiments of the present invention.

The present invention is more particularly described in the following examples that are intended as illustrative only since numerous modifications and variations therein will be apparent to those skilled in the art. Various embodiments of the invention are now described in detail in conjunction with the accompanying drawings. Referring to the drawings, like numbers indicate like components throughout the views.

In accordance with the purposes of this invention, as embodied and broadly described herein, this invention, in one aspect, relates to a dispersion compensation fiber (DCF).

Referring to FIG. 1, a composition structure of a DCF is schematically shown in FIG. 1 according to the present invention. The fibers with different performance parameters are obtained by changing weight percentages of elements in the layers according to various embodiments of the present invention. In the embodiments, a PCVD process is adopted to manufacture a core rod of a fiber preform, and a pure quartz glass layer, or a quartz glass layer doped with germanium or fluorine and chlorine is deposited on an inner wall of a highly pure quartz glass base pipe. Then, the hollow quartz pipe after the deposition is collapsed to form a solid quartz glass core rod; and finally, the core rod is put into a quartz glass casing pipe to form a preform, which is drawn to be the DCF at a high temperature on a drawing tower. Composition structure parameters and optical transmission parameters of the DCF according to Embodiments 1-4 are shown in Table 2 below:

TABLE 2

Parameters of the DCF According to Embodiments 1-4 of the Invention

| EMBODIMENTS | 1 | 2 | 3 | 4 |
|---|---|---|---|---|
| germanium wt(%) (fiber core) | 24.81 | 16.94 | 32.25 | 26.13 |
| fluorine wt(%) (trench cladding) | 2.75 | 3.66 | 1.23 | 2.45 |
| germanium wt(%) (annular cladding) | 6.77 | 4.12 | 9.56 | 7.05 |
| fluorine wt(%) (matching cladding) | 0.98 | 2.76 | 0.35 | 0.71 |
| chlorine wt(%) (fiber core) | 0.22 | 0.98 | 0.11 | 0.35 |
| chlorine wt(%) (trench cladding) | 0.10 | 0.27 | 0.55 | 0.25 |
| chlorine wt(%) (annular cladding) | 0.15 | 0.28 | 0.22 | 0.41 |
| chlorine wt(%) (matching cladding) | 0.11 | 0.36 | 0.44 | 0.25 |
| Δ1 (%) | 1.70 | 1.56 | 2.20 | 1.79 |
| Δ2 (%) | −0.50 | −0.55 | −0.31 | −0.42 |
| Δ3 (%) | 0.47 | 0.41 | 0.64 | 0.45 |
| Δ4 (%) | −0.11 | −0.05 | −0.13 | −0.14 |
| R1 (μm) | 1.58 | 1.48 | 1.43 | 1.69 |
| R2 (μm) | 4.44 | 4.14 | 4.4 | 4.73 |

TABLE 2-continued

Parameters of the DCF According to
Embodiments 1-4 of the Invention

| EMBODIMENTS | 1 | 2 | 3 | 4 |
|---|---|---|---|---|
| R3 (µm) | 7.25 | 6.75 | 7.11 | 8.55 |
| R4 (µm) | 11.15 | 10.25 | 10.12 | 16.31 |
| R5 (µm) | 59 | 40 | 38 | 62 |
| dispersion coefficient @155 nm (ps/nm-km) | −207.50 | −209.61 | −197.90 | −250.72 |
| RDS1550 (nm$^{-1}$) | 0.0038 | 0.0035 | 0.0034 | 0.0033 |
| attenuation @155 nm (dB/km) | 0.365 | 0.387 | 0.401 | 0.424 |
| PMD (1525 to 1565 nm) (ps/km$^{1/2}$) | 0.09 | 0.15 | 0.23 | 0.05 |
| total splice loss at two ends @1550 nm (dB) | 1.7 | 1.4 | 1.9 | 1.6 |
| contact splice time (s) | 37 | 24 | 55 | 78 |

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A dispersion compensation fiber (DCF), comprising:
    a fiber core; and
    claddings surrounding the fiber core,
    wherein the fiber core comprises a core layer mainly doped with germanium and having a positive relative refractive index difference;
    wherein the claddings surrounding the fiber core comprise a trench cladding mainly doped with fluorine, an annular cladding mainly doped with germanium, a matching cladding mainly doped with fluorine, and an outermost mechanical cladding disposed from the inner to the outer in sequence;
    wherein relative refractive index difference ranges of the fiber core and the claddings are respectively:
    $\Delta 1$ % being in a range of 1.55 % to 2.20 %;
    $\Delta 2$ % being in a range of −0.55 % to −0.30 %;
    $\Delta 3$ % being in a range of 0.40 % to 0.65 %;
    $\Delta 4$ % being in a range of −0.20 % to −0.01 %; and
    $\Delta 5$ % being 0;
    wherein radius ranges, from R1 to R5, of the fiber core and the claddings are respectively:
    R1 being in a range of 1.4 to 1.7 µm;
    R2 being in a range of 4.1 to 4.8 µm;
    R3 being in a range of 6.7 to 8.8 µm;
    R4 being in a range of 10 to 17 µm; and
    R5 being in a range of 38 to 63 µm; and
    wherein
    a weight percentage of germanium in the fiber core is in a range of 15 wt % to 35 wt %;
    a weight percentage of fluorine in the trench cladding is in a range of 1 wt % to 5 wt %;
    a weight percentage of germanium in the annular cladding is in a range of 4 wt % to 10 wt %; and
    a weight percentage of fluorine in the matching cladding is in a range of 0.3 wt % to 3 wt %.

2. The DCF according to claim 1, wherein
    the weight percentage of germanium in the fiber core is in a range of 20 wt % to 30 wt %;
    the weight percentage of fluorine in the trench cladding is in a range of 2.0 wt % to 3.5 wt %;
    the weight percentage of germanium in the annular cladding is in a range of 5 wt % to 8 wt %; and
    the weight percentage of fluorine in the matching cladding is 0.7 wt % to 1.5 wt %.

3. The DCF according to claim 1, wherein a weight percentage of chlorine in the fiber core and the claddings is in a range of 0 wt % to 1.0 wt %.

4. The DCF according to claim 3, wherein
    a weight percentage of chlorine in the fiber core is in a range of 0.1 wt % to 0.4 wt %;
    a weight percentage of chlorine in the trench cladding is in a range of 0.1 wt % to 0.3 wt %;
    a weight percentage of chlorine in the annular cladding is in a range of 0.1 wt % to 0.3 wt %;
    a weight percentage of chlorine in the matching cladding is in a range of 0.1 wt % to 0.4 wt %; and
    a weight percentage of chlorine in the mechanical cladding is in a range of 0.1 wt % to 0.7 wt %.

5. The DCF according to claim 1, wherein
    a dispersion coefficient at a wavelength range of 1530 nm to 1565 nm is −120 ps/nm-km to −260 ps/nm-km;
    a dispersion slope is negative;
    an attenuation coefficient is smaller than or equal to 0.45 dB/km; and
    a relative dispersion slope (RDS) is in a range of 0.0033 nm$^{-1}$ to 0.0040 nm$^{-1}$.

6. The DCF according to claim 5, wherein polarization mode dispersion is smaller than or equal to 0.25 ps/km$^{1/2}$.

7. The DCF according to claim 1, wherein total splice loss at two contacts between a dispersion compensation module made of the DCF and a single mode fiber (SMF) pigtail is smaller than or equal to 2 dB.

8. The DCF according to claim 1, wherein time for splicing one contact between the DCF and a single mode fiber (SMF) pigtail is less than or equal to 90 s.

* * * * *